United States Patent [19]
Lemay

[11] Patent Number: 6,049,270
[45] Date of Patent: Apr. 11, 2000

[54] VEHICLE SECURITY HARNESS SYSTEM

[76] Inventor: Michael W. Lemay, 3911 Brill Rd., Indianapolis, Ind. 46227

[21] Appl. No.: 09/213,115

[22] Filed: Dec. 17, 1998

[51] Int. Cl.⁷ ................................................ B60R 25/10
[52] U.S. Cl. .................. 340/426; 340/425.5; 340/545.1; 180/286; 180/289
[58] Field of Search ................ 340/425.5, 426, 340/541, 545.1; 180/271, 286, 287, 289

[56] References Cited

U.S. PATENT DOCUMENTS

| | | | |
|---|---|---|---|
| 4,159,834 | 7/1979 | Miller et al. | 49/460 |
| 4,284,982 | 8/1981 | Downey | 340/546 |
| 4,383,242 | 5/1983 | Sassover et al. | 307/10.5 |
| 5,438,312 | 8/1995 | Lewis | 340/457 |
| 5,600,302 | 2/1997 | Lewis | 340/457 |

*Primary Examiner*—Daryl Pope

[57] ABSTRACT

A vehicle security harness system for alerting a user when an intruder opens a door of a vehicle, such as a semi-tractor, by causing an air horn of the vehicle to sound when a door of the vehicle is opened. The vehicle security harness system includes a center ring with a pair of door straps and a cable strap coupled thereto and outwardly extending therefrom. The ends of the door straps and the cable strap opposite the center ring each have a fastener coupled thereto.

6 Claims, 2 Drawing Sheets

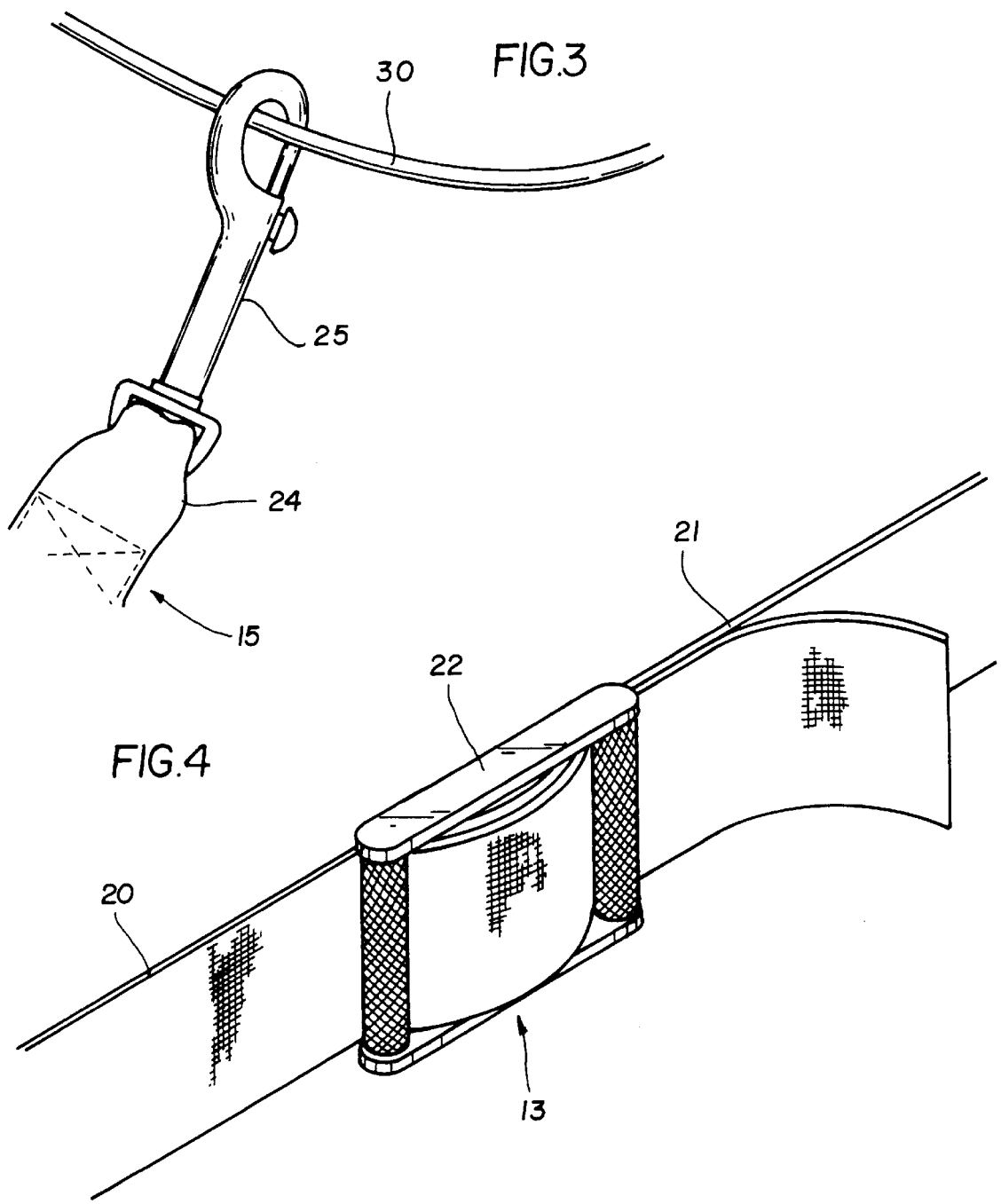

VEHICLE SECURITY HARNESS SYSTEM

BACKGROUND OF THE INVENTION

1. Field of the Invention

The present invention relates to security systems for alerting a user when an intruder opens a door of a vehicle and more particularly pertains to a new vehicle security harness system for alerting a user when an intruder opens a door of a vehicle, such as a semi-tractor, by causing an air horn of the vehicle to sound when a door of the vehicle is opened.

2. Description of the Prior Art

The use of security systems for alerting a user when an intruder opens a door of a vehicle is known in the prior art. More specifically, security systems for alerting a user when an intruder opens a door of a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,673,573 by Green; U.S. Pat. No. 4,366,605 by McKenney; U.S. Pat. No. 4,765,521 by Finnegan; U.S. Pat. No. 5,649,436 by Davidge; U.S. Pat. No. 4,120,181 by Stubbings; and U.S. Pat. No. 4,185,361 by Stuart.

While these devices fulfill their respective, particular objectives and requirements, the aforementioned patents do not disclose a new vehicle security harness system. The inventive device includes a center ring with a pair of door straps and a cable strap coupled thereto and outwardly extending therefrom. The ends of the door straps and the cable strap opposite the center ring each have a fastener coupled thereto.

In these respects, the vehicle security harness system according to the present invention substantially departs from the conventional concepts and designs of the prior art, and in so doing provides an apparatus primarily developed for the purpose of alerting a user when an intruder opens a door of a vehicle, such as a semi-tractor, by causing an air horn of the vehicle to sound when a door of the vehicle is opened.

SUMMARY OF THE INVENTION

In view of the foregoing disadvantages inherent in the known types of security systems for alerting a user when an intruder opens a door of a vehicle now present in the prior art, the present invention provides a new vehicle security harness system construction wherein the same can be utilized for alerting a user when an intruder opens a door of a vehicle, such as a semi-tractor, by causing an air horn of the vehicle to sound when a door of the vehicle is opened.

The general purpose of the present invention, which will be described subsequently in greater detail, is to provide a new vehicle security harness system apparatus and method which has many of the advantages of the security systems for alerting a user when an intruder opens a door of a vehicle mentioned heretofore and many novel features that result in a new vehicle security harness system which is not anticipated, rendered obvious, suggested, or even implied by any of the prior art security systems for alerting a user when an intruder opens a door of a vehicle, either alone or in any combination thereof.

To attain this, the present invention generally comprises a center ring with a pair of door straps and a cable strap coupled thereto and outwardly extending therefrom. The ends of the door straps and the cable strap opposite the center ring each have a fastener coupled thereto.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle security harness system apparatus and method which has many of the advantages of the security systems for alerting a user when an intruder opens a door of a vehicle mentioned heretofore and many novel features that result in a new vehicle security harness system which is not anticipated, rendered obvious, suggested, or even implied by any of the prior art security systems for alerting a user when an intruder opens a door of a vehicle, either alone or in any combination thereof.

It is another object of the present invention to provide a new vehicle security harness system which may be easily and efficiently manufactured and marketed.

It is a further object of the present invention to provide a new vehicle security harness system which is of a durable and reliable construction.

An even further object of the present invention is to provide a new vehicle security harness system which is susceptible of a low cost of manufacture with regard to both materials and labor, and which accordingly is then susceptible of low prices of sale to the consuming public, thereby making such vehicle security harness system economically available to the buying public.

Still yet another object of the present invention is to provide a new vehicle security harness system which provides in the apparatuses and methods of the prior art some of the advantages thereof, while simultaneously overcoming some of the disadvantages normally associated therewith.

Still another object of the present invention is to provide a new vehicle security harness system for alerting a user when an intruder opens a door of a vehicle, such as a semi-tractor, by causing an air horn of the vehicle to sound when a door of the vehicle is opened.

Yet another object of the present invention is to provide a new vehicle security harness system which includes a center ring with a pair of door straps and a cable strap coupled thereto and outwardly extending therefrom. The ends of the door straps and the cable strap opposite the center ring each have a fastener coupled thereto.

Still yet another object of the present invention is to provide a new vehicle security harness system that connects in the passenger compartment of the vehicle to the doors of the vehicle and an actuating cord of the air horn so that if either of the doors is opened, the actuating cord of the air horn is pulled to sound the air horn and alert the user of the intrusion and to scare away the intruder.

Even still another object of the present invention is to provide a new vehicle security harness system that lets a user sleep in the passenger compartment of the vehicle with a device that will wake the user up if the doors are opened.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic enlarged perspective view of the present invention taken from the circle 3 on FIG. 1.

FIG. 4 is a schematic enlarged perspective view of the present invention taken from the circle 4 on FIG. 1.

DESCRIPTION OF THE PREFERRED EMBODIMENT

Figure 1:
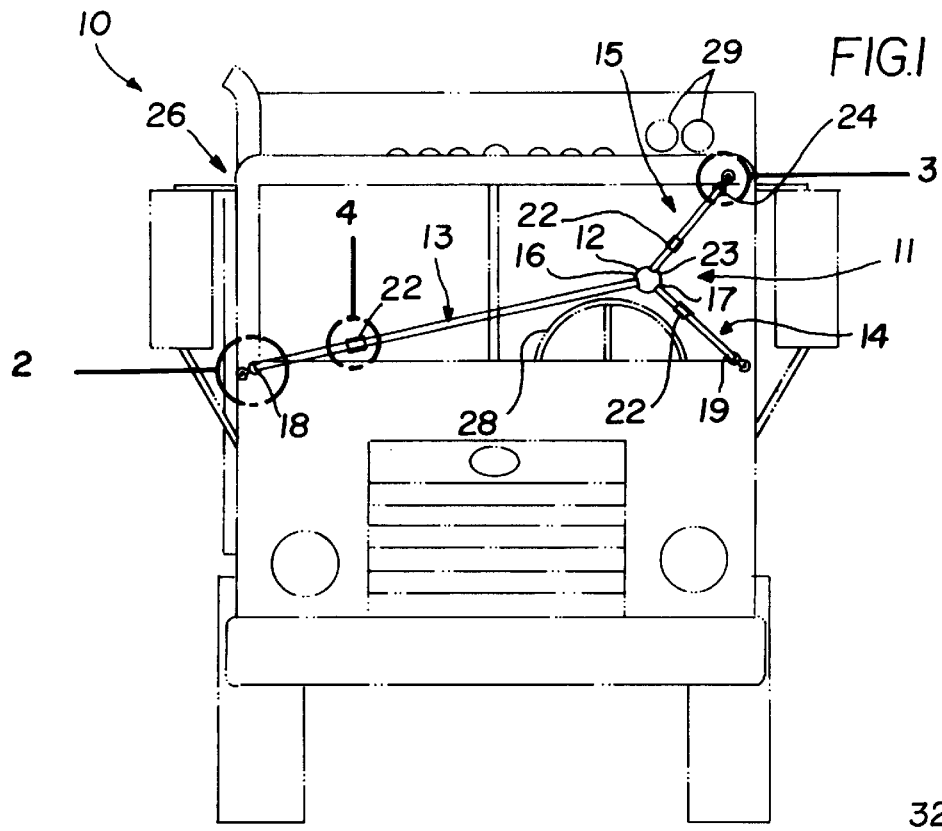
FIG. 1 is a schematic front view of a new vehicle security harness system with the vehicle shown in broken lines according to the present invention.

With reference now to the drawings, and in particular to FIGS. 1 through 4 thereof, a new vehicle security harness system embodying the principles and concepts of the present invention and generally designated by the reference numeral 10 will be described.

As best illustrated in FIGS. 1 through 4, the vehicle security harness system 10 generally comprises a center ring with a pair of door straps and a cable strap coupled thereto and outwardly extending therefrom. The ends of the door straps and the cable strap opposite the center ring each have a fastener coupled thereto.

Figure 2:
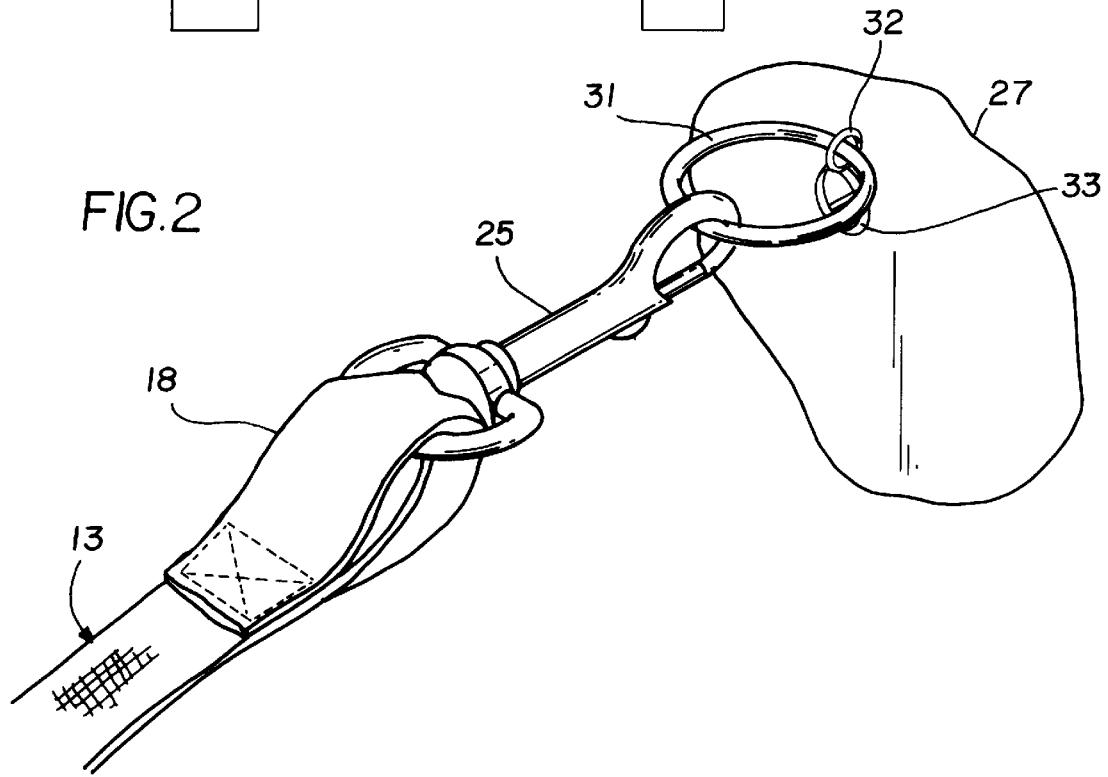
FIG. 2 is a schematic enlarged perspective view of the present invention taken from the circle 2 on FIG. 1.

In closer detail, the vehicle security harness system 10 comprises a harness 11 comprising a generally circular center ring 12, a pair of elongate flexible door straps 13,14 and an elongate flexible cable strap 15. The door straps each has opposite first and second ends 16,17,18,19. The first ends 16,17 of the door straps are coupled to the center ring to permit sliding of the first ends of the door straps on the center ring to permit adjustable positioning of the first ends of the door straps on the center ring. Preferably, the length of each of the door straps is adjustably extendable between the ends of the respective door strap. With reference to FIG. 2, ideally, the door straps each have a pair of separate elongate portions 20,21 and a buckle 22 adjustably coupling associated elongate portions of the respective door strap together to permit adjusting of the overall length of the respective door strap.

The elongate flexible cable strap also has opposite first and second ends 23,24. The first end of the cable strap is coupled to the center ring to permit sliding of the first end of the cable strap on the center ring to permit adjustable positioning of the first end of the cable strap on the center ring. Optionally, the length of the cable strap is adjustably extendable between the ends of the cable strap. Ideally, the cable strap has a pair of separate elongate portions and a buckle (similar to the door straps) adjustably coupling the elongate portions of the cable strap together to permit adjusting of the overall length of the cable strap.

As illustrated in FIGS. 2 and 3, the second ends of the door straps and the cable strap each preferably have a spring bolt clip 25 coupled thereto. Even more preferably, each of the spring bolt clips is swivelably coupled to the second end of the associated strap to permit rotation of each spring bolt clip with respect to the associated strap.

In use, a vehicle 26 (such as a semi-tractor) is provided having a passenger compartment or cab, a pair of pivotally mounted side doors 27 into the passenger compartment, a steering wheel 28 provided in the passenger compartment adjacent one of the doors, and an exteriorly mounted air horn 28. The air horn has an actuating cable 30 extending into the passenger compartment of vehicle. The actuating cable preferably has a portion positioned above the steering wheel of the vehicle. In use, the actuating cable sounds the horn to emit an audible sound when the actuating cable is pulled.

Each of the doors of the vehicle has a connecting ring 31 coupled thereto in the passenger compartment of the vehicle. Preferably, each of the connecting rings has a mounting bracket coupling each connecting ring to the associated door of the vehicle. Each of the mounting brackets preferably comprises a loop 32 connected to a threaded fastener 33. The threaded fastener is threadably inserted into the associated door. Each of the connecting rings is extending through the loop of the associated mounting bracket to couple the connecting rings to their associated doors.

With particular reference to FIG. 2, the spring bolt clip of a first of the door straps is coupled to the connecting ring of a first of the doors to connect the second end of the first door strap to the first door. The spring bolt clip of a second of the door straps is coupled to the connecting ring of a second of the doors to connect the second end of the second door strap to the second door. With particular reference to FIG. 3, the spring bolt clip of the cable strap is coupled to the actuating cable of the air horn to connect the second end of the cable strap to the actuating cable. Ideally, the spring bolt clip of the cable strap is coupled to the portion of the actuating cable positioned about the steering wheel. The center ring is preferably generally positioned in the passenger compartment of the vehicle above the steering wheel of the vehicle.

In use, opening of either door pulls the associated door strap in an outwards direction such that the cable strap pulls the actuating cable to cause the actuating cable to sound the air horn.

Each of the straps has a length defined between the first and second ends of the respective strap. For tractor cabs has the actuating cable exposed adjacent the drivers side door, ideally, the length of the cable strap is about 1 foot, the length of the first door strap is about 4 feet and the length of the second door strap is about 8 feet. For tractor cabs has the actuating cable exposed in a more centered portion between the doors, ideally, the length of the cable strap is between about 6 inches and about 1 foot, the length of the first door strap is about 8 feet and the length of the second door strap is about 8 feet.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle security harness security system, comprising:
   a harness comprising:
   a generally circular center ring;
   a pair of elongate flexible door straps each having opposite first and second ends, said first ends of each of said door straps being coupled to said center ring to permit sliding of said first ends of said door straps on said center ring;
   each of said door straps being adjustably extendable between said ends of the respective door strap, wherein said door straps each have a pair of separate elongate portions and a buckle adjustably coupling associated elongate portions of the respective door strap together;
   an elongate flexible cable strap having opposite first and second ends, said first end of said cable strap being coupled to said center ring to permit sliding of said first end of said cable strap on said center ring;
   said cable strap being adjustably extendable between said ends of said cable strap, wherein said cable strap has a pair of separate elongate portions and a buckle adjustably coupling said elongate portions of said cable strap together;
   said second ends of said door straps and said cable strap each having a spring bolt clip coupled thereto, wherein each of said spring bolt clips is swivelably coupled to the second end of the associated strap to permit rotation of each spring bolt clip with respect to the associated strap;
   a vehicle having a passenger compartment, a pair of doors into said passenger compartment, a steering wheel provided in said passenger compartment adjacent one of said doors, and a horn;
   said horn having an actuating cable in said passenger compartment of vehicle, said actuating cable sounding said horn to emit an audible sound when said actuating cable is pulled, said actuating cable having a portion positioned above said steering wheel of said vehicle;
   each of said doors of said vehicle having a connecting ring coupled thereto in said passenger compartment of said vehicle, wherein each of said connecting rings has a mounting bracket coupling each connecting ring to the associated door of the vehicle;
   each of said mounting brackets comprising a loop connected to a threaded fastener, said threaded fastener being threadably inserted into the associated door, each of said connecting rings being extending through the loop of the associated mounting bracket;
   said spring bolt clip of a first of said door straps being coupled to said connecting ring of a first of said doors to connect said second end of said first door strap to said first door;
   said spring bolt clip of a second of said door straps being coupled to said connecting ring of a second of said doors to connect said second end of said second door strap to said second door;
   said spring bolt clip of said cable strap being coupled to said actuating cable of said horn to connect said second end of said cable strap to said actuating cable, wherein said spring bolt clip of said cable strap is coupled to the portion of said actuating cable positioned about said steering wheel;
   said center ring being generally positioned in said passenger compartment of said vehicle above said steering wheel of said vehicle; and
   wherein opening of either door pulls the associated door strap in an outwards direction such that said cable strap pulls said actuating cable to cause said actuating cable to sound said horn.

2. A vehicle security harness system, comprising:
   a center ring;
   a pair of elongate flexible door straps each having opposite first and second ends, said first ends of each of said door straps being coupled to said center ring;
   an elongate flexible cable strap having opposite first and second ends, said first end of said cable strap being coupled to said center ring;
   said second ends of said door straps and said cable strap each having a fastener coupled thereto; and
   a vehicle having a passenger compartment, a pair of doors into said passenger compartment, a steering wheel provided in said passenger compartment adjacent one of said doors, and a horn, said horn having an actuating cable in said passenger compartment of vehicle, said second end of a first of said door straps being coupled to a first of said doors, said second end of a second of said door straps being coupled to a second of said doors, said second end of said cable strap being coupled to said actuating cable.

3. The vehicle security harness system of claim 1, each of said fasteners comprises a spring bolt clip.

4. The vehicle security harness system of claim 3, wherein each of said spring bolt clips is swivelably coupled to the second end of the associated strap to permit rotation of each spring bolt clip with respect to the associated strap.

5. The vehicle security harness system of claim 1, wherein each of said doors of said vehicle having a connecting ring coupled thereto in said passenger compartment of said vehicle, said fastener of said first door strap being coupled to said connecting ring of said first door, said fastener of said second door strap being coupled to said connecting ring of said second door, said fastener of said cable strap being coupled to said actuating cable.

6. The vehicle security system of claim 5, wherein each of said connecting rings has a mounting bracket coupling each connecting ring to the associated door of the vehicle, each of said mounting brackets comprising a loop connected to a threaded fastener, said threaded fastener being threadably inserted into the associated door, each of said connecting rings being extending through the loop of the associated mounting bracket.

* * * * *